United States Patent [19]

Hackell

[11] Patent Number: 5,022,033
[45] Date of Patent: Jun. 4, 1991

[54] RING LASER HAVING AN OUTPUT AT A SINGLE FREQUENCY

[75] Inventor: Lloyd A. Hackell, Livermore, Calif.

[73] Assignee: The United States of America as represented by the United States Department of Energy, Washington, D.C.

[21] Appl. No.: 428,540

[22] Filed: Oct. 30, 1989

[51] Int. Cl.$^5$ ............................................. H01S 3/11
[52] U.S. Cl. ...................................... 372/25; 372/10; 372/13; 372/94
[58] Field of Search ................... 372/9, 10, 25, 29, 30, 372/32, 94, 98, 102, 13; 356/350

[56] References Cited

U.S. PATENT DOCUMENTS

| | | | |
|---|---|---|---|
| 3,824,492 | 7/1974 | Brienza et al. | 372/10 |
| 3,975,692 | 8/1976 | Mego et al. | 372/9 |
| 4,057,770 | 11/1977 | Henningsen et al. | 372/13 |
| 4,167,712 | 9/1979 | Esterowitz | 331/94.5 F |
| 4,194,168 | 3/1980 | Jarrett et al. | 372/98 |
| 4,656,635 | 4/1987 | Baer | 372/27 |
| 4,660,205 | 4/1987 | Harter et al. | 372/94 |
| 4,701,929 | 10/1987 | Baer | 372/71 |
| 4,756,003 | 7/1988 | Baer et al. | 372/13 |

OTHER PUBLICATIONS

S. Basu et al., "Short Pulse Injection Seeding of Q-Switched Nd:Glass Laser Oscillators . . . ", IEEE J. Quantum Electron, vol. 26, No. 1, pp. 149–157, Jan. 1990.
C. J. Norrie et al., "Single Frequency Operation of Diode-Laser Array Trasverse-Pumped Q-Switched Nd:YAG Laser," Electron Lett., vol. 25, No. 17, pp. 1115–1116, Aug. 17, 1989.
L. J. Rahn, "Feedback Stabilization of an Injection-Seeded Nd:YAG Laser," Appl. Optics, vol. 24, No. 7, pp. 940–942, Apr. 1, 1985.
R. E. Teets, "Feedback to Maintain Injection Locking of Nd:YAG Lasers," IEEE J. Quantum Electron, vol. QE-20, No. 4, pp. 326–328, Apr. 1984.
A. E. Siegman, *Lasers*, University Science Books, 1986, See Especially pp. 532–538, 1154–1162, 1163–1164.

*Primary Examiner*—Frank Gonzalez
*Assistant Examiner*—Susan S. Morse
*Attorney, Agent, or Firm*—Hugh W. Glenn; Robert J. Fisher; William R. Moser

[57] ABSTRACT

A ring laser is disclosed that produces a single frequency of laser radiation in either the pulsed mode of operation or the continuous waveform (cw) mode of operation. The laser comprises a ring laser in a bowtie configuration, a birefringent gain material such as Nd:YLF, an improved optical diode that supports laser oscillation having a desired direction of travel and linear polarization, and a Q-switch. An output coupler (mirror) having a high reflectivity, such as 94%, is disclosed. Also disclosed is a self-seeded method of operation in which the laser can provide a pulse or a series of pulses of high power laser radiation at a consistent single frequency with a high degree of amplitude stability and temporal stability. In operation, the laser is operated in continuous waveform (cw) at a low power output with the Q-switch introducing a loss into the resonating cavity. Pumping is continued at a high level, causing the gain material to store energy. When a pulse is desired, the Q-switch is actuated to substantially reduce the losses so that a pulse can build up based on the low level cw oscillation. The pulse quickly builds, using the stored energy in the gain medium to provide a high power output pulse. The process may be repeated to provide a series of high power pulses of a consistent single frequency.

22 Claims, 3 Drawing Sheets

RING LASER HAVING AN OUTPUT AT A SINGLE FREQUENCY

The United States Government has rights in this invention pursuant to Contract No. W7405-ENG-48 between the United States Department of Energy and the University of California for the operation of Lawrence Livermore National Laboratory.

BACKGROUND OF THE INVENTION

1. Field of the Invention

The present invention relates to lasers producing an output beam at a single frequency with a narrow linewidth. More specifically, the present invention relates to lasers having a ring oscillator configuration and a solid state gain medium.

2. Description of Related Art

Many laser designs have been developed since the invention of the laser thirty years ago. Each different design has its advantages, and often there are tradeoffs between attainable design goals. In the design of a laser resonator, usually a tradeoff exists between output power and beam characteristics; more power usually means that the beam quality is less uniform or less single wavelength, or does not have a single polarization. An important design consideration is the output wavelength. High power outputs are provided by gain materials that lase in the infrared, such as Nd:YAG that lases at 1.06 $\mu$m and Nd:glass that lases at 1.05 $\mu$m. High power lasers typically operate in the pulsed mode, outputting short, high intensity bursts of light that release energy stored in the gain material. Other lasers operate in "cw", or continuous waveform that continuously outputs a beam from energy continuously applied to a gain medium.

Very high power pulsed lasers may actually comprise a number of lasers or power amplifiers connected together. A "seed", or "master" oscillator generates a single wavelength laser output which is provided to one or more power amplifiers. This configuration may be termed "MOPA" (Master Oscillator - Power Amplifier). An optimal master oscillator will produce light with a single wavelength and a high power which can be effectively amplified by the lasers or the power amplifiers. If other wavelengths are present in the output from the master oscillator, interaction between the wavelengths will lead to localized areas of intense radiation. These localized areas may lead to damage to components carrying that radiation if the intensity at that localized area is above the damage threshold of the component, such as amplifier material or mirrors or lenses. Therefore, high power lasers have been conventionally operated at an output intensity three or four times less than the damage threshold, to allow for the localized areas where the intensity may be greater. If only a single frequency were to oscillate in the laser, the laser could operate much closer to its damage threshold without damaging the optical components. Such a single frequency could be provided by a master oscillator producing a single frequency laser output.

The MOPA configuration is an example of injection, wherein a weak but well stabilized laser can control a much higher power laser. Injection concepts are applicable to a low-power laser that seeds or injects its beam into a second laser. This second laser (generally a higher power laser) may be inherently noisy and unstable, and oscillate in two or more wavelengths and transverse modes. When the low-power laser beam is injected, the higher power laser becomes much more stable.

In cw lasers, injection locking is a method of controlling a high-power cw laser with another low-power, well-controlled, stabilized cw laser. Injection locking concepts are also pertinent in the pulsed laser configurations such as the MOPA configuration, however direct application of these concepts developed for cw laser injection locking is not possible due to the transient nature of the pulse. Injection in the pulsed laser context may more aptly be termed "seeding", rather than locking because the pulse develops on its own, overwhelming the seeding injection.

The word "laser" is actually an acronym for "Light Amplification by Stimulated Emission of Radiation". Laser radiation has application in a wide variety of disciplines, such as communications, medicine, the military, research, and any other field where directed electromagnetic radiation is an advantage. The light produced from a laser has many known applications, and it is reasonable to expect that many applications of the laser have yet to be discovered. A typical laser comprises three basic elements: a resonating cavity, a gain medium, and a means to pump the gain medium.

The resonating cavity of a laser may comprise two opposed mirrors that reflect electromagnetic radiation (such as light). Other resonator configurations, such as the configuration of the ring laser, comprise three or more mirrors that reflect the light from mirror to mirror. One of the mirrors typically has less than 100% reflectivity so that a portion of the light will be transmitted and the remainder will be reflected. The output of the laser passes through this mirror, which is sometimes termed the "output coupler". For example, an output coupler may have 90% reflectivity, which means that 10% of the incident optical energy will be transmitted, and the remainder (90%) will be reflected.

The gain medium of a laser may comprise any of a variety of materials: solid materials such as Nd:YAG or Er:YAG, gases such as $CO_2$ or $Ar^+$, and liquids such as dye. The gain material absorbs energy from the pump, storing that energy in the form of higher energy states in the molecular or sub-atomic level.

Pumping the gain medium may be accomplished conventionally by any of a variety of devices. A lamp may be used to pump a laser that operates in the pulsed mode. A very high intensity flash of light from the lamp is absorbed by the gain material, which can then release its stored energy in a laser pulse. Flashlamps are often used to pump solid state lasers such a Nd:YAG or Nd:glass. Pumping can be accomplished in other lasers by application of an electrical current across the gain medium. Gas lasers, such as the helium-neon (HeNe) lasers or the $CO_2$ lasers typically use electrical current to pump the laser.

Due to the smallness of the optical wavelengths, a standard laser cavity can support oscillation at many different wavelengths. A laser cavity resonator may oscillate simultaneously at several wavelengths, or "modes", or oscillation may alternate or vary between one or more of the modes competing for the gain of the laser. In some applications, the existence of several competing modes is acceptable; however, for other applications a laser that can produce a single frequency output is highly desirable. Much research is currently being devoted to design lasers whose output is a single frequency. Due to various physical constraints and design criteria, the output laser energy is generally distributed around that wavelength within a finite frequency range. The lasers that come closest to a "single wavelength" oscillate in a single mode and have a single narrow bandwidth around that single wavelength.

An etalon may be used to select the center wavelength. An typical etalon comprises a pair of opposing reflective faces that are spaced apart a distance that will support oscillation at only a specific wavelength. However, the material properties of the reflective surfaces and other material limitations restrict the ability of the etalon to produce an exact single frequency.

The ring laser configuration is known in the art to produce an output that is highly single frequency, and has been used with gain media including dye, gas and solid state materials. Dye lasers having a ring configuration are widely used and commercially available. These dye lasers produce a laser output that is often termed "single wavelength", although precisely speaking it is not a single frequency; there is some (narrow) bandwidth. As an additional feature of the ring laser configuration, only a single polarization is supported.

Despite their advantages, ring lasers have not been employed in high power applications due in part to their low efficiency and the inability to remain at a single frequency at high power. Additional problems include operating the same laser in either pulsed or cw; typically a ring laser is designed for cw operation or it is designed for pulsed operation which is generally more difficult to do.

A concern of designers of a single frequency laser is its reliability to replicate that single frequency consistently. During operation, frequency, output power, or any of a variety of characteristics may waver, due to a variety of complications such as variations in the gain due to input power fluctuations. For example, the center frequency of a laser pulse may be at 1.053001 $\mu$m, the next pulse may have a center frequency at 1.053003 $\mu$m and continue to waver erratically. Injection locking of a ring laser by a smaller, external, well-controlled laser can produce a single frequency of operation; however, this requires servo control of the cavity length of the ring laser to that of the external laser.

In a pulsed laser it is desirable to produce a series of pulses as nearly identical as possible. Performance criteria for the pulsed laser includes energy output, rise time, temporal stability, amplitude stability, and single mode (frequency) content. Energy output is a measure of the intensity of the pulse integrated over the beam area. Rise time is a measure of how quick the pulse rises from minimum amplitude to approximately full amplitude. Temporal stability is a measure of predictability of the rise time between pulses; it is desirable to have this figure as small as possible, down in the tens of nanoseconds. Amplitude stability is a measure of predictability of the amplitude from pulse to pulse; it is desirable to have this figure down to a few percent.

For many high power applications, the gain medium of the power amplifiers is Nd:YAG which lases at 1.06 $\mu$m. or Nd:glass which lases at 1.05 $\mu$m. Thus, the master oscillator must produce this same wavelength. Dye lasers are unsuited as the master oscillator around 1.05 $\mu$m. Although dye lasers are tunable by conventional techniques to provide any one of a number of different output wavelengths, existing dye lasers cannot be tuned to attain the 1.05 $\mu$m wavelength necessary for seeding solid state glass amplifiers.

Thus, it would be advantageous to provide a master oscillator that has an output at a frequency around the peak gain of solid state laser materials, with a spectrum containing a single sinusoidal frequency and a high output power (8 watts continuous or >2 mJ/pulse in pulsed mode). A small frequency range for the pump laser is particularly desirable in the master oscillator of high power lasers, to minimize the possibility of damage to optical components caused by interference and reinforcement between the various wavelengths in the beam. Such a master oscillator can be used as a single frequency seed for high power laser systems for military tracking and other applications such as laser fusion. Furthermore, the master oscillator can be used to seed a high power laser which powers an x-ray source applicable in lithography.

Nd:YLF as a gain material has been used in high power pulsed oscillators that have a linear configuration. It has been suggested that it can be used as the gain medium in a ring laser configuration.

SUMMARY OF THE INVENTION

An object of the present invention is to provide a series of laser pulses that have a reliable single frequency. The present invention provides a laser that reliably produces an output at 1.05 $\mu$m having a narrow linewidth. A method of operation of the present invention self-seeds the laser so that the pulses produced are reliably at a single frequency, in a single transverse mode, and stable in time from pulse to pulse. Although described in the context of ring lasers, this method of operation is applicable to resonators that have a linear configuration, and any configuration in addition to the ring configuration.

The laser of the present invention performs in the pulsed mode or in the cw (continuous waveform) mode. The method of operation takes advantage of the ring laser's single frequency cw performance by allowing a small amount of cw power to continuously circulate in the resonator and thus initiate a self-seeding response when the gain is Q-switched to produce a pulse of larger power. This form of operation bears resemblance to the more commonly used injection locking but has an advantage that it does not require servo control of the injection laser cavity length to that of the main laser. The laser automatically seeds itself. The result is a system for producing a series of laser pulses that have a single frequency and transverse mode structure.

The laser of the present invention comprises a ring laser having an anisotropic gain medium and an optical diode aligned so that the axis of polarization of the ring laser is coincident with a gain axis of the gain medium. More specifically, the present invention comprises a ring laser, including a resonating cavity, an etalon, a gain medium that preferably comprises Nd:YLF, a discharge lamp assembly for pumping the gain medium, and an optical diode positioned in the resonating cavity of the ring laser, the optical diode transmitting the forward wave while attenuating the backward wave sufficiently that unidirectional operation is achieved in both the pulsed and cw modes of operation. The optical diode may comprise a Faraday rotator with windows at Brewster's angle formed therein, and a compensator. Preferably, the Faraday rotator comprises a material with a Verdet constant of 24.4 at 1.05 $\mu$m, and the compensator comprises a half-wave plate. Also preferably, the output coupler (mirror) from the resonating cavity comprises a transmissivity of approximately 94%.

The present invention provides a high power laser that produces a laser output with a single frequency in the 1.05 μm region. The preferred embodiment has an output at 1.053 μm with a FWHM (full width half maximum) of 10 MHz, and a high output power capability (8 watts continuous). In the pulsed mode of operation, the preferred embodiment can produce single frequency pulses of relatively high power (250 μJ to 1 mJ) and stable to ±20 ns in time from pulse to pulse.

The present invention is particularly desirable for use as the seed oscillator in the NOVA laser facility, and as the injector for other high power lasers. A single frequency minimizes the possibility of damage to optical components caused by interference and reinforcement between the various wavelengths in the beam and thereby would allow the power amplifiers to be operated at a power close to their damage threshold. The present invention is projected to be used as a master oscillator for the NOVA system and other high power laser systems of the future. Of course, if the high power provided by the MOPA configuration is not needed, the present invention could be used alone in applications that require single frequency optical radiation.

DETAILED DESCRIPTION OF THE INVENTION

The invention can be understood by reference to the figures wherein like parts are designated with like numerals throughout.

GENERAL DESCRIPTION

Figure 1:
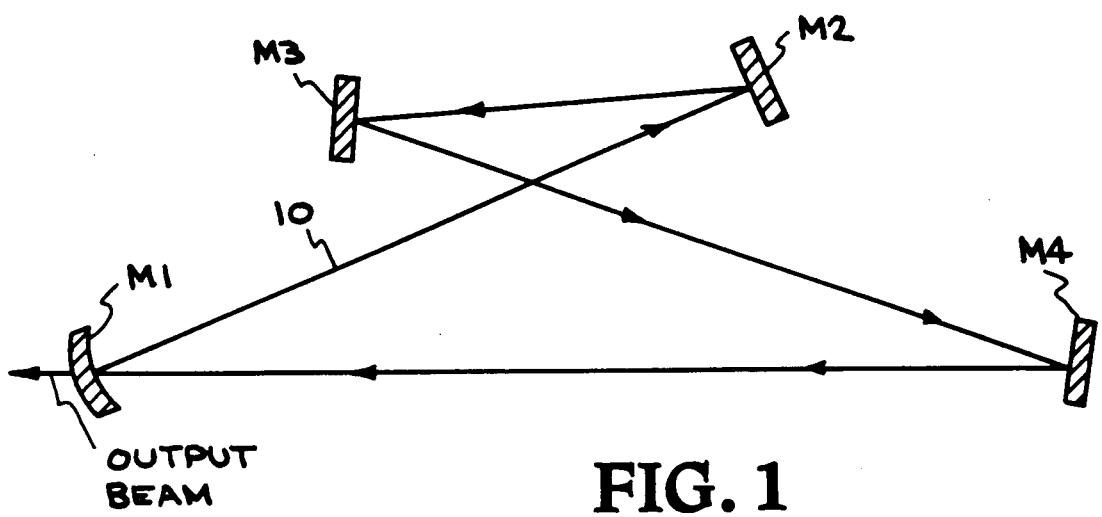
FIG. 1 illustrates a resonator including mirrors having a ring laser configuration.

The preferred embodiment of the resonator is illustrated in FIG. 1. A resonator 10 includes four mirrors, M1,M2,M3,M4 arranged in a bowtie configuration. The mirrors M2,M3,M4 comprise reflective surfaces that reflect nearly 100% of light at the desired wavelength, 1.05 μm. The output mirror, M1 has a reflectivity at that wavelength of less than 100%, in the preferred embodiment the reflectivity is ≈94%. Therefore some light is transmitted as an output, while the large majority is reflected to contribute to oscillation within the resonator 10.

In FIG. 1, the mirror M1 is the output mirror. In other embodiments, the laser output may be provided through any of the mirrors M1,M2,M3,M4, by selecting the reflectivity of the output mirror to be less than 100%, and selecting the reflectivity of the other mirrors to be as close to 100% as possible.

Figure 2:
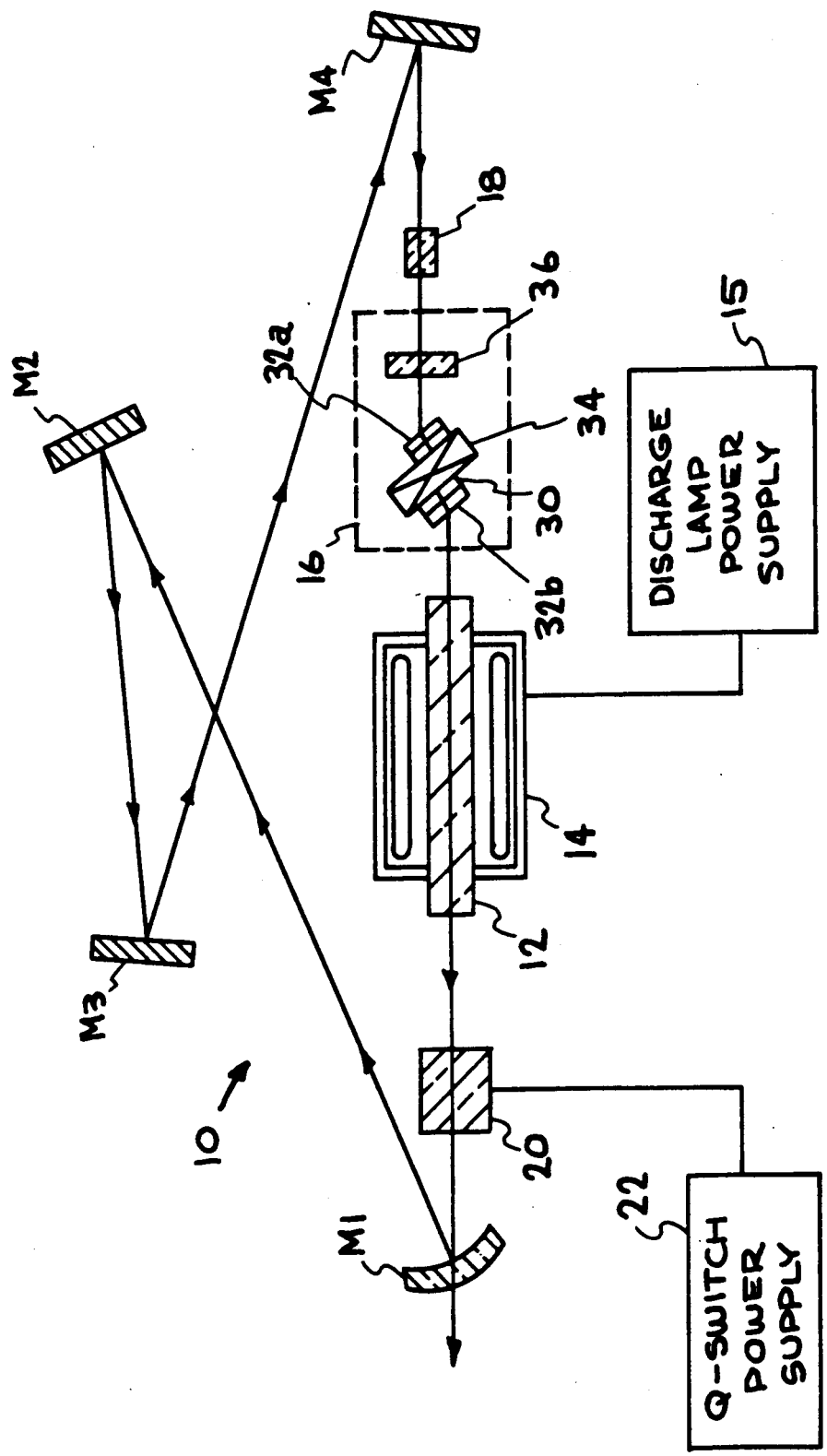
FIG. 2 illustrates the components inside the resonator of the ring laser configuration, showing the components in schematic or block form.

FIG. 2 illustrates the resonator 10 with other components positioned within the resonator 10. One of these components is gain material 12 which is a block of solid state laser material, preferably Nd:YLF, shaped in the form of a rod. The rod is installed in a position so that the beam within the resonator 10 passes axially through the gain material 12. Pumping is provided by a conventional cylindrical discharge lamp and reflector assembly 14 such as that sold in the laser Model 117 available from Quantronix Corporation of Smithtown, N.Y. The discharge lamp for the assembly 14 is controlled and powered by a control circuit and power source 15.

The laser of the present invention also includes an optical diode 16 positioned in the resonator 10. The optical diode 16 restricts the beam in the resonator 10 to light travelling in one direction and having one polarization. The diode attenuates light travelling in the opposite direction, or light with a different polarization. An etalon 18 is positioned within the resonator 10 to select a single frequency of oscillation. Etalons are known in the art, and the etalon 18 may comprise a solid piece of quartz polished and coated on each end. A Q-switch 20 is also included, which comprises an acousto-optic material such as quartz. The Q-switch 20 is controlled and powered by a conventional high frequency power supply such as a rf (radio frequency) power supply 22 that can produce an output of up to 50 W at 68 MHz constant frequency.

SPECIFIC DESCRIPTION

The preferred embodiment of the resonator 10 is in the "bowtie" configuration, comprising the four mirrors M1,M2,M3,M4. Although the mirror M1 is illustrated to be curved, and the mirrors M2,M3,M4 are illustrated flat, the exact amount of curvature of each of the mirrors is not essential to principles of the present invention. It will be obvious to one skilled in the art that other ring laser configurations can be readily substituted for the bowtie configuration. Any typical stable ring cavity design may provide a suitable design for the resonator 10. For example, a three mirror triangular configuration may be utilized.

An advantage of the ring laser configuration is that it allows the resonator 10 to support oscillation in one direction; i.e., electromagnetic oscillation can be supported travelling in one direction in a loop by bouncing from mirror to mirror and then back through the gain medium in the same direction repeatedly. For example, referring to the bowtie configuration of FIG. 2, a beam in the cavity passing from right to left through the gain medium 12 can be reflected from mirror M1, and then in sequence from the mirror M2, the mirror M3, the mirror M4, through the gain medium 12 in the left to right direction as before, and then to mirror M1 where the sequence repeats. In each pass through the gain medium 12, the laser oscillation increases in intensity until a state is reached where the gains equal the losses.

In the preferred embodiment, it was found useful to employ an output mirror, such as the mirror M1, having a reflectivity of 94%. This reflectivity percentage provides a decreased round trip loss and also decreases the population inversion at threshold, which increases the gain parameter, when compared with a lower reflectivity. Further, the higher reflectivity percentage reduces the build-up time for the pulse.

The output mirror's reflectivity figure of 94% was obtained empirically by experimentation with mirrors of different reflectivity. Earlier experiments with mirrors of lower reflectivity (≈88%) yielded poor results. By substituting mirrors having higher reflectivity, it was found that optimum pulsed and cw performance was obtained with the reflectivity at 94%. It is recognized that the optimum reflectivity in other laser systems may vary from this figure, as a result of a number of other factors such as total intracavity loss. At present the preferred method for determining output coupling reflectivity is empirical.

In the preferred embodiment, the gain medium 12 is Nd:YLF. This material has a gain characteristic that is anisotropic; gain for one polarization is at a wavelength of 1.047 microns and gain for the orthogonal polarization is at a wavelength of 1.053 microns. Furthermore, the gain of Nd:YLF is predominant in the 1.047 $\mu$m polarization direction; i.e., if oscillation with this polarization is supported, it will dominate over oscillation with the orthogonal (1.053 $\mu$m) polarization. In the present invention, the optical diode 16 allows only a single polarization to be supported in the resonator 10. In order to provide an output at 1.053 $\mu$m in the preferred embodiment, this single polarization is aligned with the weaker polarization of the gain medium 12. Thus Nd:YLF as a gain medium cooperates with the laser configuration of the present invention to produce a high power, single frequency output. If it were desired to produce an output at 1.047 $\mu$m, the single polarization could be aligned with the stronger polarization of the gain material 12.

Other gain mediums, such as Nd:YAG or Er:YAG, could be used. Many gain materials such as dye, $CO_2$, and Nd:YAG are isotropic, which means that their gain characteristics are independent of the polarization angle. However, a birefringent gain medium like Nd:YLF is preferred.

In the preferred embodiment, the gain medium 12 is pumped by conventional means such as the discharge lamp and reflector assembly 14. The discharge lamp and reflector assembly 14 is commercially available, and in the preferred embodiment comprises the laser head from a laser, Model 117, commercially available from Quantronix Corporation of Smithtown, N.Y. The reflector assembly comprises a tubular shape with an elliptical cross section. The inside surface of the reflector is coated with a highly reflective material such as gold. The discharge lamp is in the form of a rod positioned axially in the reflector along one focus of the ellipse. The gain material 12, also in the shape of a rod is positioned axially in the reflector along the other focus of the ellipse, so that substantially all of the light generated by the discharge lamp is reflected to the gain medium 12. The light is then absorbed by the gain medium to create a population inversion in the gain medium 12. A population inversion means that the number of atoms (or molecules) in an excited state is greater than the number in an unexcited state. Such a population inversion is necessary for lasing to begin.

The discharge lamp is powered by the power supply 15 shown in FIG. 2. The circuit 15 comprises means for supplying continuous electrical energy to the discharge lamp. The power supply 15 may be connected to a control circuit which can switch the electrical energy on and off to the discharge lamps. Preferably, the power supply 15 is the power supply provided with the Quantronix Model 117 laser.

The optical diode 16 comprises a Faraday rotator 30 having Brewster windows 32a,32b formed on opposing ends. The Faraday rotator 30 is positioned within the resonator 10 in a position such that the beam passes through the Brewster window 32a, travels axially thorough the Faraday rotator 30, and exits through the Brewster window 32b. The Faraday rotator 30 comprises a material that rotates the angle of polarization independent of the direction of wave propagation. Specifically, the Faraday rotator 30 comprises a transparent material that has a finite Verdet constant when placed in a dc magnetic field. To create a magnetic field, a solenoid permanent magnet 34 is positioned annularly surrounding the glass of the Faraday rotator 30 so that it applies a dc magnetic field through the rotator 30. When a polarized optical wave passes through the rotator 30, its polarization is rotated about the optical axis, the rotation being in a direction that depends upon the applied magnetic field but not on the direction of travel of the wave.

A compensator 36 is also included in the optical diode 16. The compensator 36 comprises a material, such as optically active quartz that rotates the angle of polarization. The compensator 36 differs from the Faraday rotator 30 in that the compensator 36 rotates the polarization dependent upon the direction of propagation, while the Faraday rotator 30 rotates the polarization dependent upon the magnetic field direction and independently of the propagation direction. The Faraday rotator 30 and the compensator 36 are arranged so that the polarization angle rotations of the light propagating in one desired direction cancel each other, giving no net polarization change to light propagating in that direction. However, for an optical wave propagating in the other direction, the polarization angles add.

The ends 32a, 32b of the Faraday material are cut at Brewster's angle so that they pass substantially all power of an optical wave having a certain direction of polarization, while attenuating the power of an optical wave that has an orthogonal polarization. The net effect on an optical wave passing through the Faraday rotator 30 and the compensator 36 is to pass a wave travelling in one direction of propagation, while attenuating an optical wave travelling in the other direction. Thus, as an optical wave propagates in each pass through the cavity, the optical diode 30 passes the wave travelling in one direction, allowing it to build in intensity, while attenuating the wave travelling in the opposite direction so that it has no chance to build to a significant intensity.

As a result, the optical wave propagates unidirectionally in the form of a travelling wave throughout the resonator 10, including through the gain material 12 thereby maximizing energy extraction from the gain material 12 by avoiding hole burning effects.

Due to its operational characteristics, the optical diode 30 passes light polarized in only one direction,. As discussed previously, the gain material 12 of the preferred embodiment is Nd:YLF which has gain characteristics that are dependent upon polarization. Thus, the Nd:YLF gain material 12 is arranged within the resonator 10 in a position where the 1.053 $\mu$m gain axis is aligned with the polarization direction effected by the optical diode 16. The result is that the optical wave passed by the optical diode 16 has a polarization identical with the polarization at which Nd:YLF has the desired wavelength.

The present invention includes an improved optical diode. In the preferred embodiment, the Faraday rotator 30 comprises a 1.3 cm length of FR-5 glass, which is available from Hoya Corporation of Fremont, Calif. This glass has a Verdet constant of 24.4 at 1.05 $\mu$m, and should provide a rotation of approximately 6° across the length of 1.3 cm.

The compensator 36 of the preferred embodiment provides sufficient rotation to reverse the Faraday rotation in the forward direction (and therefore double it in the reverse direction). The compensator 36 comprises an anti-reflection coated half-wave plate positioned in the resonator 10 at normal incidence to the oscillating beam. The compensator 36 is a conventional half-wave plate available from CVI Laser Corp of Albuquerque, N. Mex. To tune the axial position of the compensator 36 so that it provides the appropriate amount of rotation, it was placed at normal incidence to the beam, and rotated around its axis during cw operation of the laser until minimum loss was obtained.

The etalon 18 selects a single frequency amoung the several frequencies whose oscillation is supported in the resonator 10. The etalon 18 comprises a pair of opposed partially reflective surfaces positioned apart a precise distance. The length of separation is selected to determine the oscillation frequency. The etalon of the preferred embodiment has a separation length of 30 mm and comprises a solid piece of quartz polished on each end to $\lambda/20$ and coated on each end to R=50%. A suitable etalon is available from CVI Laser Corp. of Albuquerque, N. Mex.

Figure 4:
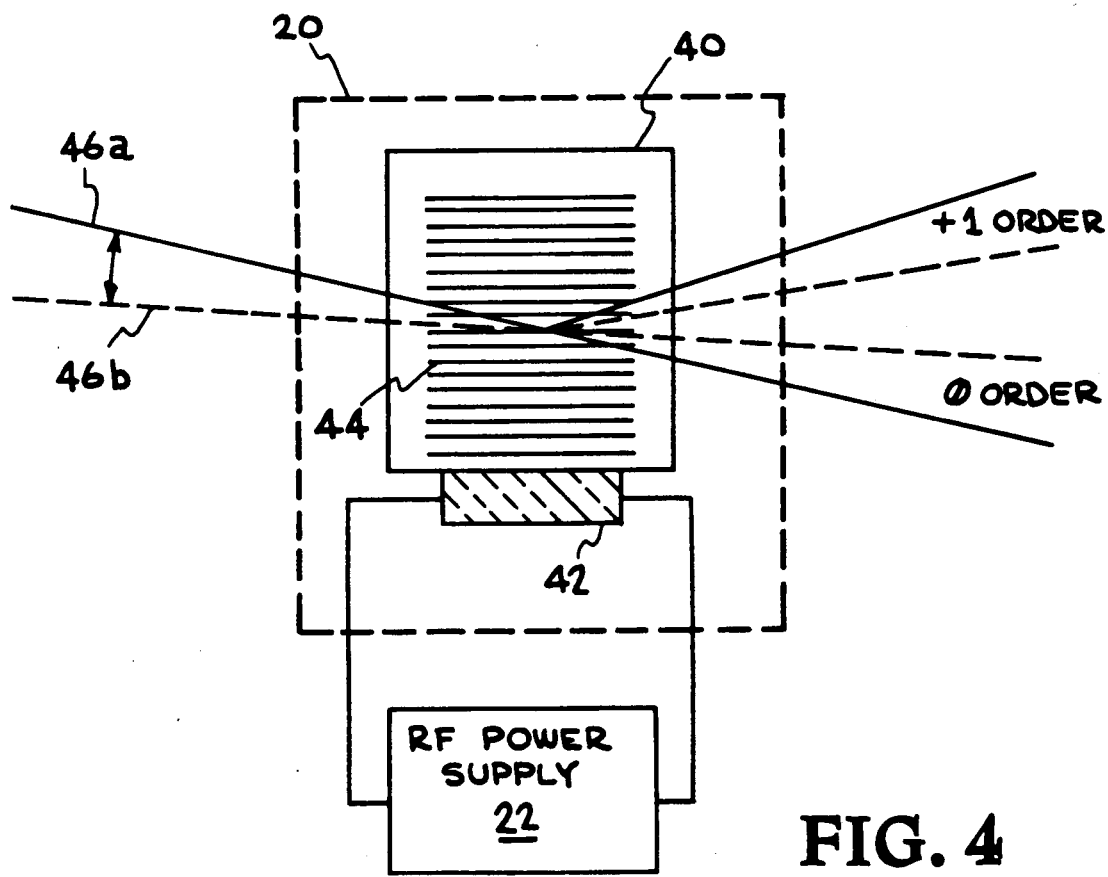
FIG. 4 illustrates an acousto-optic modulator and two laser beams with different angles interacting with the acousto-optic modulator.

The conventional Q-switch 20 is a device for selectively inserting a loss into the resonator 10. The Q-switch 20 is positioned within the resonator 10 of the laser of the present invention. Referring to FIG. 4, the Q-switch 20 comprises a block of acoustic material such as the quartz block 40. The quartz 40 is mechanically connected to an acoustic transducer such as a piezoelectric crystal 42. The crystal 42 is electrically connected to the rf power supply 22. When rf power is applied, the piezoelectric crystal 42 generates acoustic waves which are transmitted to the quartz 40 to create a standing wave pattern illustrated as a series of parallel lines 44. The standing wave pattern 44 then interacts with the optical oscillation propagating within the resonator 10. This optical oscillation is illustrated as a beam 46.

The quartz 40 is positioned at a particular angle with respect to the incident beam 46 within the resonator 10 so that the acoustic wave pattern deflects a portion of light beam 46. Two different angles of the beam 46 are illustrated; a beam 46a intersects the block 40 at one angle, and a beam 46b intersects the block 40 at another, less severe angle. The undeflected portion of each beam 46a,46b is illustrated as "0 order", and the deflected portion is illustrated as "+1 order". Light that is deflected from the path of the beam 46 in the resonator 10 (the +1 order) does not contribute to oscillation in the resonator 10, thus introducing losses into the resonator 10. In typical Q-switch applications, the loss provided by the Q-switch 20 can be varied to allow the resonator 10 to freely support laser oscillation, or to prevent laser oscillation from occurring. The amount of loss is dependent upon the intensity of the beam 46 that passes through undeflected (the 0 order). The intensity ratio between the 0 and the +1 orders is dependent upon the intensity of the acoustic waves and the angle that the acoustic wave pattern makes with the incident light beam 46. Conventionally, the loss within the resonator is varied by controlling the rf power applied to the Q-switch 20. For example, if the rf power supply 22 is switched off so that the beam 46 passes through substantially undeflected, substantially no loss is inserted into the resonator 10. Operation of a laser in a pulsed mode is conventionally facilitated by the Q-switch 20. While the Q-switch 20 is actuated to deflect a substantial portion of the beam 46, losses in the resonator 10 are sufficient to prevent oscillation. While the Q-switch 20 prevents oscillation, energy from the discharge lamp 14 can be stored in the gain medium 12. Then, when the Q-switch 20 is switched to allow oscillation, laser oscillation quickly develops a substantial energy from the stored energy in the gain medium 12. The result is a high energy laser pulse that decays in energy as the energy stored in the gain medium 12 is consumed. In the novel self-seeding mode to be described in another section, the loss of the Q-switch 20 is selected to permit limited cw oscillation, which allows for storage of energy in the gain medium 12.

In the preferred embodiment, the Q-switch 20 comprises a conventional acousto-optic device, which is available from Inrad Corp of Northvale, N.J. The Q-switch 20 of the preferred embodiment comprises quartz 40 which is mechanically connected to a piezoelectric crystal 42, which is in turn connected to the rf power supply 22. The conventional rf power supply 22 has an output of up to 50 W at 68 MHz. A suitable rf power supply 22 is available from Inrad Corp. of Northvale, N.J. The rf power supply 22, operating at a continuous frequency of 68 MHz, has an amplitude that is adjustable from 0 to 100 volts.

OPERATION IN SELF-SEEDING PULSED, Q-SWITCHED MODE

When operated in a self-seeded mode, the laser provides a series of pulses, each of which has a single, identical frequency. The laser of the present invention can operate either in the pulsed mode or in the cw (continuous waveform) mode, due in part to the improved optical diode 30, the increased reflectivity of the output coupler (mirror), and adjustment of the Q-switch 20. The quality of operation in the cw mode allows for operation at a low power output.

In the present invention, the Q-switch 20 is adjusted to provide loss at a level low enough to cause substantial losses in the resonator 10, but high enough to allow cw operation at a low level of power. To introduce the low level losses through the Q-switch 20, the power output of the rf power supply 22 may be adjusted so that cw operation is supported at a low output level. However, in the preferred embodiment, it has been found that high performance can be obtained by adjusting the angle of the quartz 40 of the Q-switch 20 with respect to the incident beam 46. For this purpose, the Q-switch 20 is affixed in a mount that provides precise mechanical rotation of its angle with respect to the incident beam 46.

To adjust the angle of the quartz 40, a two-step process is preferred. In the first step, the rf power supply 22 is actuated continuously without interruption. The laser is made operational by actuating the power supply 15 to pump the gain material 12, so that lasing can occur in a cw mode. The quartz 40 of the Q-switch 20 is mechanically rotated with respect to the incident beam 46 until an angle is obtained where the losses induced by the Q-switch 20 prohibit lasing action; i.e., the Q-switch 20 is rotated until no acousto-optic deflection is obtained and the cavity oscillates cw. From that position, the quartz 40 is rotated back sufficiently to permit weak cw lasing action.

In the second step, the angle of the Q-switch 20 is adjusted for operation in a pulsed mode. While observing cw operation from the first step, the rf power supply 22 is periodically interrupted, causing the Q-switch 20 to switch on and off with each interruption. During each interruption, an output pulse is produced that is seeded by the cw operation. The rf power supply 22 is interrupted at a fixed frequency, causing production of a series of Q-switched laser pulses, each being seeded by the cw operation. These pulses are observed for characteristics such as temporal stability (regularity in time), and amplitude of the output laser pulses. The Q-switch 20 is rotated to obtain minimum jitter (i.e., maximum temporal stability). Also, the Q-switch 20 is rotated to increase output until the cw extinguishes (thus precluding seeding) or until so much pulsed output gain is available that additional cavity modes oscillate.

As an explanation of the seeded Q-switched operation, the Q-switch 20 while actuated causes losses in the resonator 10 although cw oscillation is occurring. As a result, the gain material 12 may be highly pumped by the discharge lamp and reflector assembly 14 so that it contains a large amount of stored energy, only a portion of which is being used to support weak cw oscillation. While the gain material 12 remains highly pumped, power to the Q-switch 20 may be turned off to substantially reduce the losses inside the resonator 10. Then, the optical energy oscillating inside the resonator 10 quickly increases in intensity, creating a seeded laser pulse that has much higher power than the cw seeding beam.

The output pulse has beam qualities similar to those of the cw beam. Because the pulse is formed in the environment of a cw beam, the oscillation that creates the pulse builds preferentially on the same frequency and transverse mode as the weak cw operation. This oscillation based on the cw oscillation builds up well ahead of any competing mode, and therefore is the primary mode in the output pulse.

Thus, to create a series of pulses at a single frequency, weak cw operation is maintained by inducing losses with the Q-switch 20. Pumping of the gain material 12 causes a large energy storage before each successive pulse is released. In the preferred embodiment, the discharge lamp may be pumped with a continuous current of 34 amperes at 208 volts. To release each pulse, the Q-switch 20 is opened for a short period of time, for example 10 μs. Following each pulse, the Q-switch 20 is returned to its lossy state, allowing weak cw operation in preparation for the next step.

Preferably, conventional beam diagnostics are used to monitor the cw output so that the output pulses have the desired wavelength and transverse mode. If the diagnostics detected any unwanted beam characteristics, action could be taken to correct the problem, such as shutting down the laser and adjusting it to provide the desired beam.

Figure 3:
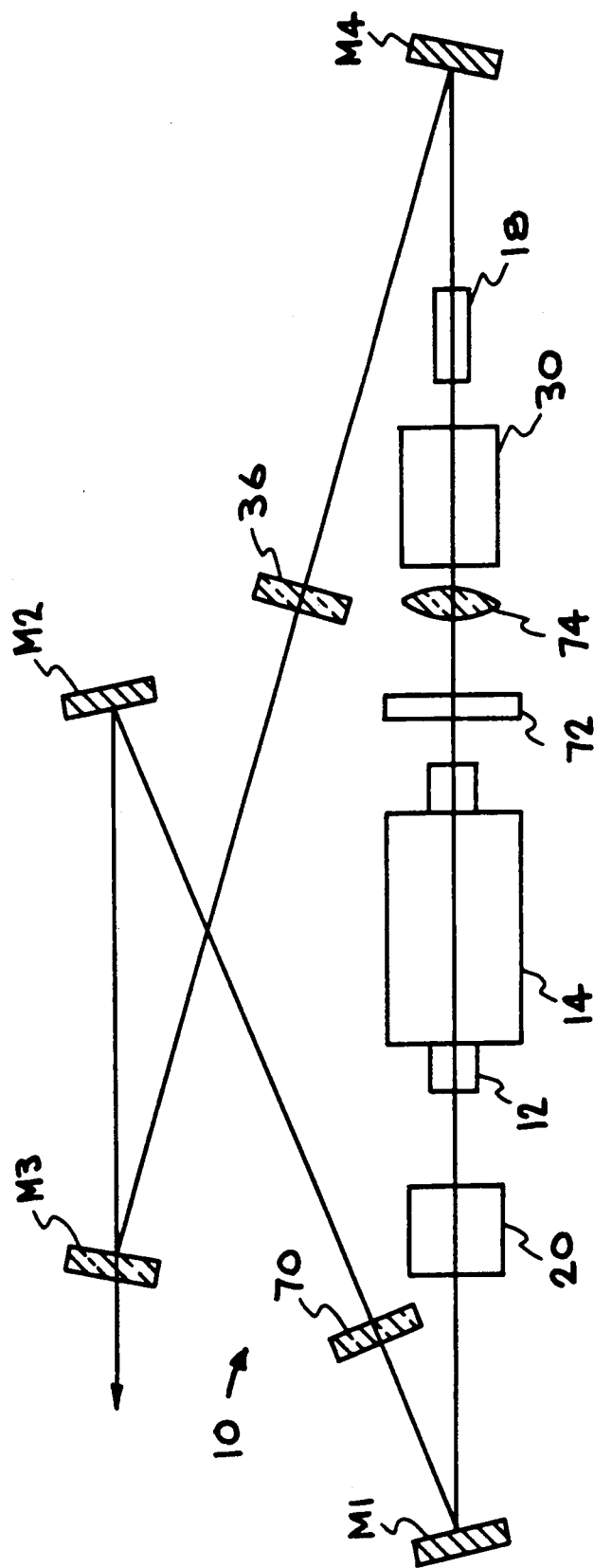
FIG. 3 illustrates the relationship between the optical components in a preferred embodiment of the present invention.

The preferred embodiment of the present invention has produced reliable pulsed single frequency output. FIG. 3 illustrates a schematic diagram of a preferred embodiment of a laser constructed according to the principles of the present invention. An etalon 70, positioned between the mirror M1 and the mirror M2, is included in addition to the etalon 18. Laser output occurs through the mirror M2, although any of the mirrors M1,M3,M4 may be employed to this purpose in other embodiments. This embodiment includes a shutter 72 for switching beam propagation in the resonator 10, and a cylindrical lens 74 for correcting beam astigmatism.

In this embodiment, the etalon 70 is positioned 105 mm from the mirror M1 and 378 mm from the mirror M2. Also, the Nd:YLF laser rod 12 is positioned 243 mm from the mirror M1 and the Q-switch 20 is positioned 24 mm from Nd:YLF laser rod 12. From the other end of the laser rod 12, the distance to the Faraday rotator 30 is 110 mm, the distance to the etalon 18 is 246 mm, and the distance to the mirror M4 is 394 mm. The compensator 36 is positioned between the mirror M4 and M3, 373 mm from the mirror M4 and 320 mm from the mirror M3. The mirror M3 is positioned 134 mm from the mirror M2.

The laser of the preferred embodiment can produce a series of pulses having an energy in the 0.25 to 1.0 mJ range at a repetition rate of up to 10 KHz. The pulse-to-pulse temporal stability is approximately ±20 ns and the pulse-to-pulse amplitude stability is several percent. This output is suitable for use as an injection laser for regeneratively amplified high average power solid state lasers.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing descriptions. All changes which come within the meaning and range of equivalency of the claims are to be embraced within their scope.

I claim:

1. A method of operating a laser to obtain an output pulse of laser radiation having a single wavelength, the laser including a resonator, a gain medium positioned in said resonator and a pump source, said method comprising the steps of:
   (a), inserting an intracavity loss into the laser resonator, said loss being an amount that permits operation of the laser in the continuous waveform (cw) mode;
   (b), operating the laser in the continuous waveform (cw) mode in said resonator;
   (c), storing energy in the gain medium in an amount greater than the amount of energy needed to maintain cw operation;
   (d), reducing the intracavity loss provided to said resonator in the step (a) so that excess energy stored in the gain medium in the step (c) is output from said resonator in the form of a pulse having a peak power larger than the cw power.

2. The method as claimed in claim 1, wherein the gain medium comprises neodymium ions in a solid state material, and in the step (b) and the step (c), the neodymium ions are pumped to an energy level above the ground state, so that the output pulse has a frequency of approximately 1.05 μm.

3. The method as claimed in claim 1, wherein in the step (a), the cw mode of laser operation produces an output that is a single mode and substantially single wavelength, and wherein in the step (d), the pulse builds preferentially on said cw output.

4. The method as claimed in claim 1, wherein the pumping in the step (b) comprises application of optical energy to the gain medium.

5. The method as claimed in claim 1, wherein the pumping in the step (c) comprises application of optical energy to the gain medium.

6. The method as claimed in claim 1, wherein the laser includes a Q-switch, and the intracavity loss inserted in the step (a) includes actuating a Q-switch by application of an amount of electrical energy sufficient to operate the laser at a low output level in the cw mode.

7. The method as claimed in claim 6, wherein the step (d) includes actuating the Q-switch with an amount of electrical energy sufficient to substantially reduce the loss within said resonator.

8. The method as claimed in claim 1, comprising a step (e) of repeating the through the steps (a) through (d).

9. The method as claimed in claim 1, wherein a series of output pulses is formed by periodically repeating the steps (a) through (d).

10. The method as claimed in claim 9, wherein in the step (d), the time period between reducing the intracavity loss and the pulse output is predictably stable from pulse to pulse within ±2 nanoseconds.

11. A laser operable in a continuous wave (cw) mode at low power, said laser being operable to provide pulses of higher peak power than the cw mode, the pulses being stable in frequency and predictable in time, said laser comprising:

a resonating cavity that supports laser oscillation;

a gain medium positioned in the resonating cavity, said gain medium having a size for storing an energy amount greater than the amount of energy necessary for cw operation;

means for pumping the gain medium;

a Q-switch positioned in said resonating cavity, said Q-switch being switchable between at least two states, a substantially transparent state, and a lossy state, said lossy state introducing substantial losses into said resonating cavity while being sufficiently transparent to allow cw operation in said resonating cavity;

wherein the Q-switch functions in said lossy state to operate the laser in the cw mode, said pumping means operates to store energy in the gain medium in an amount greater than the amount of energy necessary for cw operation, and the Q-switch is switched to said substantially transparent state in order to output a pulse of higher peak power than the cw mode.

12. The laser as claimed in claim 11, further comprising an etalon positioned in the cavity to select a single frequency of laser operation.

13. The laser as claimed in claim 11 wherein the resonating cavity has a ring configuration.

14. The ring laser as claimed in claim 13, wherein the ring configuration comprises four mirrors in a bowtie configuration.

15. The laser as claimed in claim 3 wherein the laser comprises an optical diode positioned in the resonating cavity of the ring laser, said optical diode substantially transmitting laser oscillation travelling in a first direction through the cavity, while substantially attenuating the laser oscillation travelling in a second, opposite direction.

16. The ring laser as claimed in claim 15, wherein said optical diode transmits substantially one linear polarization of the forward travelling laser oscillation.

17. The ring laser as claimed in claim 15, wherein the gain medium comprises a birefringent material whereby the gain is dependent upon polarization, said gain material being positioned in the beam path of the resonating cavity so that a polarization axis of the gain medium is aligned with the polarization supported by the optical diode.

18. The ring laser as claimed in claim 17, wherein the gain material comprises Nd:YLF.

19. The ring laser as claimed in claim 18, wherein the pumping means comprises a discharge lamp positioned so that its light is incident upon the gain medium, said lamp being continuously illuminated during laser operation.

20. The ring laser as claimed in claim 16, wherein the optical diode includes a Faraday rotator and a compensator.

21. The ring laser as claimed in claim 20, wherein the Faraday rotator comprises a material with a Verdet constant of approximately 24.4, and the compensator comprises a half-wave plate.

22. The ring laser as claimed in claim 11, wherein the resonating cavity has an output mirror with a transmissivity of approximately 94%.

* * * * *